May 17, 1955 G. JENSEN ET AL 2,708,424
DEVICE FOR INTRODUCING STEAM INTO THE GAS MIXTURE
SUCKED INTO AN INTERNAL COMBUSTION ENGINE
Filed Nov. 3, 1952
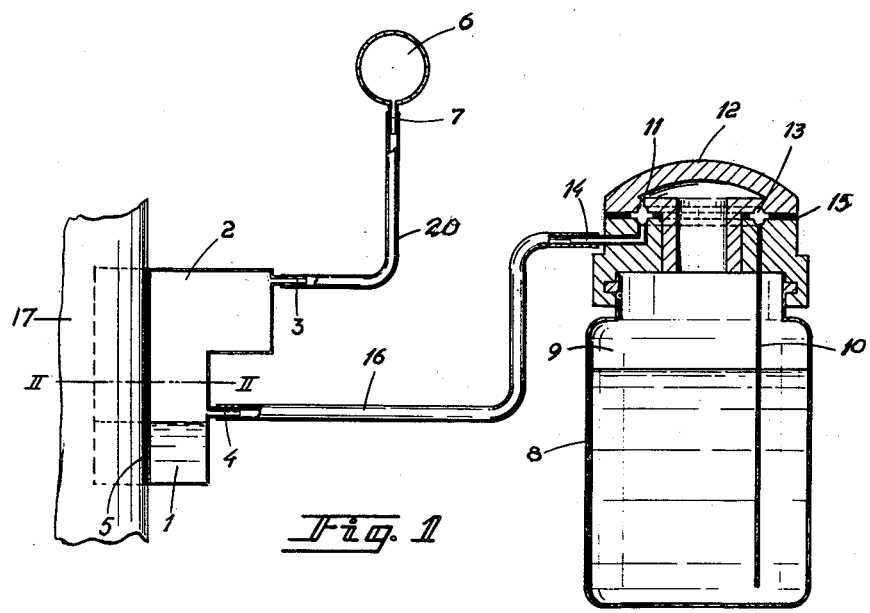
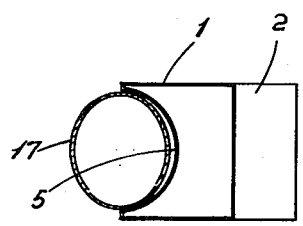
INVENTORS
Gunnar Jensen
Richard Holm
BY: Watson, Cole, Grindle & Watson
ATTORNEYS

United States Patent Office 2,708,424
Patented May 17, 1955

2,708,424

DEVICE FOR INTRODUCING STEAM INTO THE GAS MIXTURE SUCKED INTO AN INTERNAL COMBUSTION ENGINE

Gunnar Jensen and Richard Holm, Aarhus, Denmark; said Jensen assignor to Helge Laurent-Christensen, Aarhus, Denmark Application November 3, 1952, Serial No. 318,492

Claims priority, application Denmark November 16, 1951

2 Claims. (Cl. 123—25)

This invention relates to improvements in devices (hereinafter termed "devices of the kind referred to") for supplying steam to the combustible mixture of internal combustion engines.

As is well known, steam when introduced into the combustible mixture which is passed to an internal combustion engine counteracts the deposit of carbon on the walls of the cylinder and on the pistons and on the spark plugs of the engine thereby contributing to a reduction of the wear and tear on the pistons and on the piston-rings, and reducing disturbances of the ignition and the possibility of self ignition of the combustible mixture in the engine.

Devices of the kind referred to comprise an airtight closed water tank and a heat exchange unit arranged to cause evaporation of water which, due to the influence of the suction effect in the inlet manifold of the engine, is caused to flow from the water tank through said heat-exchange unit to the said manifold, the heat-exchange unit being heated by the exhaust of the engine and arranged to be connected to the intake manifold of the motor as well as to the water tank. The heat-exchange unit is connected to the water tank by means of a conduit extending into the water tank above the water level of the tank and extending within the tank down to the bottom region of same.

In order to provide satisfactory operation of an internal combustion engine in which the fuel mixture is supplied with an amount of steam, it is very important that the supply of steam is adjusted automatically in response to variation of the load of the engine and especially so as to prevent steam being continuously introduced into the intake system of the engine when running at a constant or substantially constant speed.

Furthermore, it is of importance that under no circumstances shall non-vaporized water be allowed to enter the intake system of the engine when starting the engine in a cold condition, because such entrance of water into the engine may have a very injurious effect upon the engine in disturbing the starting operation and giving rise to the formation of rust and other unfavorable disturbances in the engine.

Previously known devices of the kind referred to are not able to satisfy both of the two conditions set forth above. In some of the hitherto known devices of the kind referred to, the heat-exchange unit is arranged to receive and collect a certain although relatively small amount of the water transferred to it from the water tank by the suction effect of the intake system of the engine, and is so arranged that the water collected in it when reaching a predetermined value automatically closes the aperture of the unit into the conduit connecting the said unit to the water tank.

Such devices may meet the last mentioned conditions referred to above, but are not, in hitherto known embodiments, able to fulfill the first of the conditions referred to.

There exists, however, a device of the kind referred to in which the first mentioned condition, although not the other conditions, is fulfilled. This device has a heat-exchange unit which is not able to collect any substantial amount of water, and has a narrow transverse bore provided in that part of the conduit interconnecting the heat-exchange unit and the water reservoir which is located in the uppermost part of the cavity of the water tank above the water level therein. By way of said transverse narrow bore a condition of equilibrium is established and maintained between the cavity in the water tank above the water level and the pressure within the inlet-manifold of the engine when the latter is running steadily so that water, during this running condition of the engine is not taken from the water tank.

The object of the present invention is to provide a simple device of the kind referred to which enables fulfillment of the two conditions referred to above, namely, the interruption of the supply of steam to the engine when running steadily and the prevention of any possible supply of non-vaporized water to the inlet manifold of the engine during starting operation of same.

According to the present invention a device for supplying steam to the combustible mixture of an internal combustion engine comprises an air-tight tank for water, a steam generator for receiving water from said tank and adapted to be arranged in heat transmitting contact with heating means such as the exhaust pipe of said combustion engine, a first conduit connecting with said steam generator at a level above the water level in the generator and adapted to connect said steam generator to the intake-manifold of the engine, a second conduit connecting with the steam generator at a lower level than said first conduit and tapping into the said water tank at a level above the water level in said tank and extending within said tank towards the bottom region of same, and a narrow bore connecting the interior of said second conduit to the interior of said water tank above the water level in said tank.

The water reservoir or tank of the device may be fitted with a removable cap or lid, adapted to close the said tank in an air-tight manner and according to the invention a passage forming part of the conduit between the steam generator and the bottom region of the interior of the water tank may be provided in the engagement faces between said cap and the body of the water reservoir, which passage ensures that no water may be discharged from the water tank by the influence of the suction effect of the engine, if the said cap is removed from the said reservoir during running of the engine, e. g., when fresh water is to be filled into the tank.

In a preferred embodiment, the conduit connecting the water reservoir and the steam generator opens into the latter towards, but somewhat above, the bottom of the generator and, as previously mentioned, in the water reservoir said conduit extends through a passage preferably provided in the cover of the reservoir, or in the abutment surface between the latter and the body of the water reservoir, to a suction pipe, extending downwardly towards the bottom of the reservoir. By this arrangement, the water supplied from the water reservoir to the steam generator will automatically adjust itself in such a manner that the water level in the steam generator will normally assume a position approximately level with the opening of the connecting conduit into the steam generator, so that excessive filling of the latter is avoided without preventing the collection of a desirable amount of water. As previously mentioned, the conduit between the steam generator and the intake manifold is connected to the generator above the inlet to the generator from the water reservoir. Thus, it will be appreciated that the outlet from the generator to the intake manifold is always above the maximum water level in the generator and there is no possibility of non-vaporized water entering the engine when started in a cold condition.

In a preferred embodiment of the invention, particularly for use in automobile engines, the portion of the connecting conduit located in the water reservoir communicates, as previously mentioned, through a narrow bore with the zone of the water reservoir above the water level therein. Owing to the presence of the said narrow bore, the suction effect will extend through the connecting conduit between the steam box and the water reservoir not only to the suction pipe opening near the bottom of the water reservoir, but also to the zone of the water reservoir above the water level therein, and consequently, as long as the motor is running at a constant load, and the vacuum in the intake system is therefore constant or substantially constant, no water will be sucked into the steam box because a vacuum is gradually developed above the water level in the water reservoir, such vacuum opposing the flow of water through the suction pipe. If, on the other hand, the speed of the engine is substantially or suddenly reduced, whereby the suction effect in the intake system of the engine is substantially increased, the suction effect through the suction pipe is increased relative to the suction effect through the narrow bore communicating with the zone above the water level in the water reservoir, and consequently water is sucked from the water reservoir to the steam box.

The quantity of water to be introduced into the cylinders of an internal combustion engine to prevent the accumulation of carbon on the cylinder walls, the pistons and the spark plugs varies to some extent with the nature of the fuel and the characteristics of the engine. Ordinarily, in a gasoline operated engine, a quantity of steam corresponding to a consumption of 1 gallon of water to 20 to 30 gallons of gasoline will suffice to prevent the accumulation of carbon. However, a considerable greater quantity of steam, e. g. up to about 35% by weight of the gasoline consumption, may be introduced without injury to the motor or disturbance of its operation.

The introduction of steam also results in a reduction of the petrol consumption.

The invention will now be described in further detail with reference to the accompanying drawing in which Fig. 1 is a vertical section through a device according to the invention, and Fig. 2 is a section along the line II—II in Fig. 1 through the steam box of the device.

1 is a steam box having a steam head 2 from which the developed steam can be sucked through a socket 3 connected to a socket 7 in the intake manifold 6 of an internal combustion engine through a preferably flexible pipe 20.

A portion 5 of the side wall of the steam box has a cross sectional shape corresponding to the cross sectional shape of the exhaust pipe of the engine, so that the said wall portion can be mounted closely against the exhaust pipe 17, thereby ensuring an effective transfer of heat from the exhaust gases flowing through the exhaust pipe to the water in the steam box.

The steam box is provided at some distance above its bottom with a socket 4 for the supply of water from a water reservoir 8. The latter is constructed with a movable cover 12 adapted to be screwed into the reservoir 8 to form a gas tight seal with the aid of a packing 15.

In the abutment surface between the cover 12 and the body of the water reservoir there is provided an annular passage 13 communicating with a pipe 10 extending towards the bottom of the water reservoir 8. The said passage 13 also communicates through a narrow bore 11 having a cross sectional area substantially smaller than that of the pipe 10 with the air space 9 above the water level in the water reservoir 8, and finally, the passage 13 communicates through a socket 14 and a pipe conduit 16 with the supply socket 4 of the steam box 2.

When the device is to be used, the container 8 is filled completely or partly with water and is then closed in a gas tight manner by means of the cover 12. The operation of the device is then as follows:

Shortly after the engine has been started, the speed of rotation of the engine ordinarily decreases, thereby creating a strong suction effect in the intake manifold 6, whereby water is sucked from the water reservoir 8 through the pipe 10 and the passage 13 to the steam box 1. During running of the engine, a transfer of water by suction effect would, owing to the presence of the bore 11 take place only if the supply of combustible mixture to the engine is rapidly decreased causing a corresponding sudden increase of the suction effect in the intake manifold 6 and consequently in the steam box 1 and in the pipe conduit 16.

The transfer of water to the steam box 1 is only continued until the water level in the steam box rises to a level such as to close the opening of the supply socket 4. If in the case of a particularly strong suction effect in the steam box 1 the water rises to a higher level, a substantial part of this water will be sucked back into the water reservoir when the suction effect again decreases, and in this manner the water level again assumes a position approximately at the level of the supply socket 4.

When the exhaust pipe has become hot, the development of steam and thereby the introduction of steam into the cylinders commences, and is thereafter continued until the steam box is either emptied or cooled upon stoppage of the engine.

The quantity of steam to be introduced into the cylinders of the engine can be adjusted by suitably dimensioning the heating surface of the steam box, the volume of the latter below the supply socket 4, and the length and the cross sectional area of the conduits 16 and 20.

The provision of the passage 13 in the engagement faces between the cap 12 and the body of the water tank 8 insures that the connection between pipes 16 and 10 will be fully opened to the atmosphere upon removal of cap 12. If this opening arrangement of passage 13 were not provided and cap 12 were loosely installed, or became loose, or if seal 15 became ineffective, then water would be free to travel from the water tank to the heater in objectionable amounts because the water tank would be vented to atmosphere and pipe 10 would still be connected to pipe 16. Similarly, if cap 12 were removed to fill the tank while the engine was running, water could flow from the tank to the heater in objectionable amounts. Such objectionable flow of water from the tank to the heater is positively prevented by the divided construction of passage 13, so that the connection between pipes 16 and 10 is opened to atmosphere when the sealing engagement between the water tank body and cap 12 is broken in any manner.

We claim:

1. A device for adding steam to the combustible mixture of an internal combustion engine, comprising an airtight tank for water, a steam box for receiving water from said tank and adapted to be arranged in heat transmitting contact with the exhaust pipe of said combustion engine, a first conduit tapping into said steam box at a level above any possible water level in same and adapted to connect said steam box to the intake manifold of said combustion engine, a second conduit tapping into the steam box at a lower level than said first conduit and tapping into the said water tank at a level above any possible water level in said tank and extending within said tank towards the bottom region of same, a transversal narrow bore connecting the interior of said second conduit to the interior of said water tank above any possible water level in said tank.

2. A device for introducing steam into the combustible mixture of internal combustion engines comprising an airtight tank for water, a steam box to receive water from said water tank, a first conduit tapping into the said steam box above any possible water level in same and adapted to connect said steam box to the intake manifold of a combustion engine, a second conduit tapping into said steam box at a level below the level at which said first conduit taps into said box, and extending down into the lower region of the interior of said water tank, means for attaching said steam box to the exhaust pipe of said engine, and a removable cap on said water container, a passage forming part of said conduit and provided in the engagement faces between said cap and the body of said water tank, a narrow transversal bore in said second conduit connecting the interior of said conduit to the interior of said water tank above any possible water level in said tank.

References Cited in the file of this patent

UNITED STATES PATENTS

| | | |
|---|---|---|
| 1,466,425 | Cowles | Aug. 28, 1923 |
| 1,488,054 | Muzzy | Mar. 25, 1924 |
| 1,543,681 | Schoonmaker | June 30, 1925 |
| 1,550,967 | Kelty | Aug. 25, 1925 |
| 1,561,693 | Carter | Nov. 17, 1925 |
| 1,603,984 | Rose et al. | Oct. 19, 1925 |
| 1,672,992 | Simmermann | June 12, 1928 |